(12) United States Patent
Bhakta

(10) Patent No.: US 10,753,566 B2
(45) Date of Patent: Aug. 25, 2020

(54) METHODS AND APPARATUS FOR ILLUMINATION WITH LASER MODULATED ADAPTIVE BEAM SHAPING

(71) Applicant: TEXAS INSTRUMENTS INCORPORATED, Dallas, TX (US)

(72) Inventor: Vikrant R. Bhakta, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/167,080

(22) Filed: Oct. 22, 2018

(65) Prior Publication Data

US 2019/0056081 A1 Feb. 21, 2019

Related U.S. Application Data

(63) Continuation of application No. 14/678,950, filed on Apr. 4, 2015, now Pat. No. 10,107,467.

(60) Provisional application No. 62/017,483, filed on Jun. 26, 2014.

(51) Int. Cl.

| F21S 41/675 | (2018.01) |
|---|---|
| G02B 26/08 | (2006.01) |
| G02B 27/09 | (2006.01) |
| F21S 41/14 | (2018.01) |
| F21S 41/16 | (2018.01) |
| F21S 41/65 | (2018.01) |

(52) U.S. Cl.
CPC .......... *F21S 41/675* (2018.01); *F21S 41/14* (2018.01); *F21S 41/16* (2018.01); *G02B 26/0833* (2013.01); *G02B 27/0933* (2013.01); *F21S 41/65* (2018.01)

(58) Field of Classification Search
CPC .......... F21S 41/675; F21S 41/16; F21S 41/14; F21S 41/65; G02B 27/0933; G02B 26/0833
See application file for complete search history.

(56) References Cited

U.S. PATENT DOCUMENTS

| 5,422,792 | A | 6/1995 | Neumann |
| 9,777,901 | B2 * | 10/2017 | Reinprecht ............. F21S 41/16 |
| 2007/0206390 | A1 | 9/2007 | Brukilacchio et al. |
| 2011/0267382 | A1 | 11/2011 | Fergason et al. |
| 2013/0058114 | A1 | 3/2013 | Reiners |
| 2014/0071706 | A1 | 3/2014 | Yagi et al. |
| 2014/0306878 | A1 | 10/2014 | Bhakta |

(Continued)

*Primary Examiner* — Evan P Dzierzynski
(74) *Attorney, Agent, or Firm* — Michelle F. Murray; Charles A. Brill; Frank D. Cimino

(57) ABSTRACT

An illumination system includes at least first and second laser illumination sources. A down converter material emits light when illuminated by one or more of the laser illumination sources. The first laser illumination source is arranged to illuminate only a first portion of the down converter material. The second laser illumination source is arranged to illuminate only a second portion of the down converter material. Control circuitry causes the first laser illumination source to adaptively vary a first intensity of illuminating the first portion of the down converter material, causes the second laser illumination source to adaptively vary a second intensity of illuminating the second portion of the down converter material, and causes the light modulator to allow a selected amount of the down converter material's emitted light to be projected from the system.

35 Claims, 15 Drawing Sheets

(56) References Cited

U.S. PATENT DOCUMENTS

2015/0369437 A1 12/2015 Reinprecht et al.
2017/0138545 A1* 5/2017 Minor ................... F21K 9/60

* cited by examiner

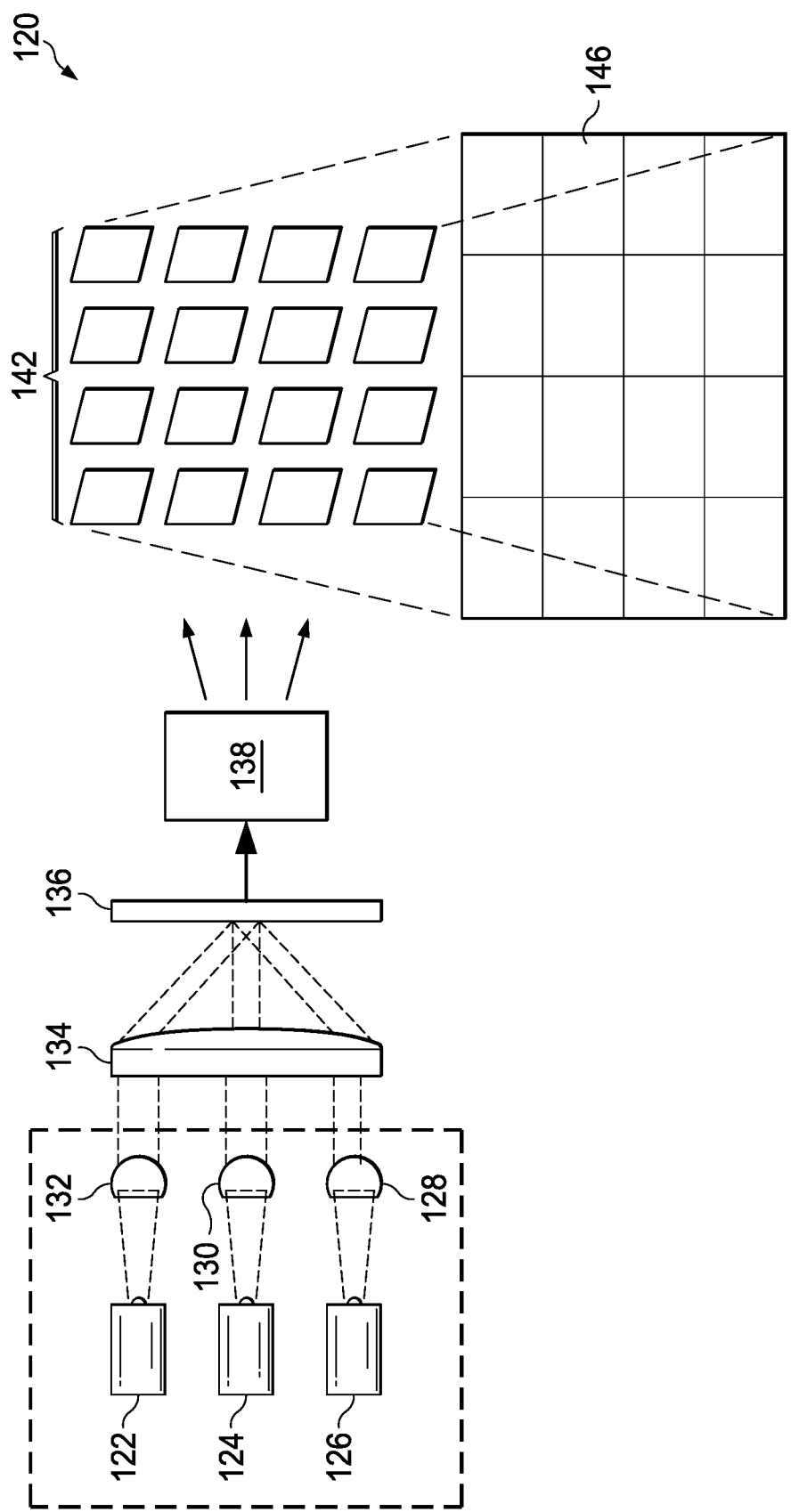

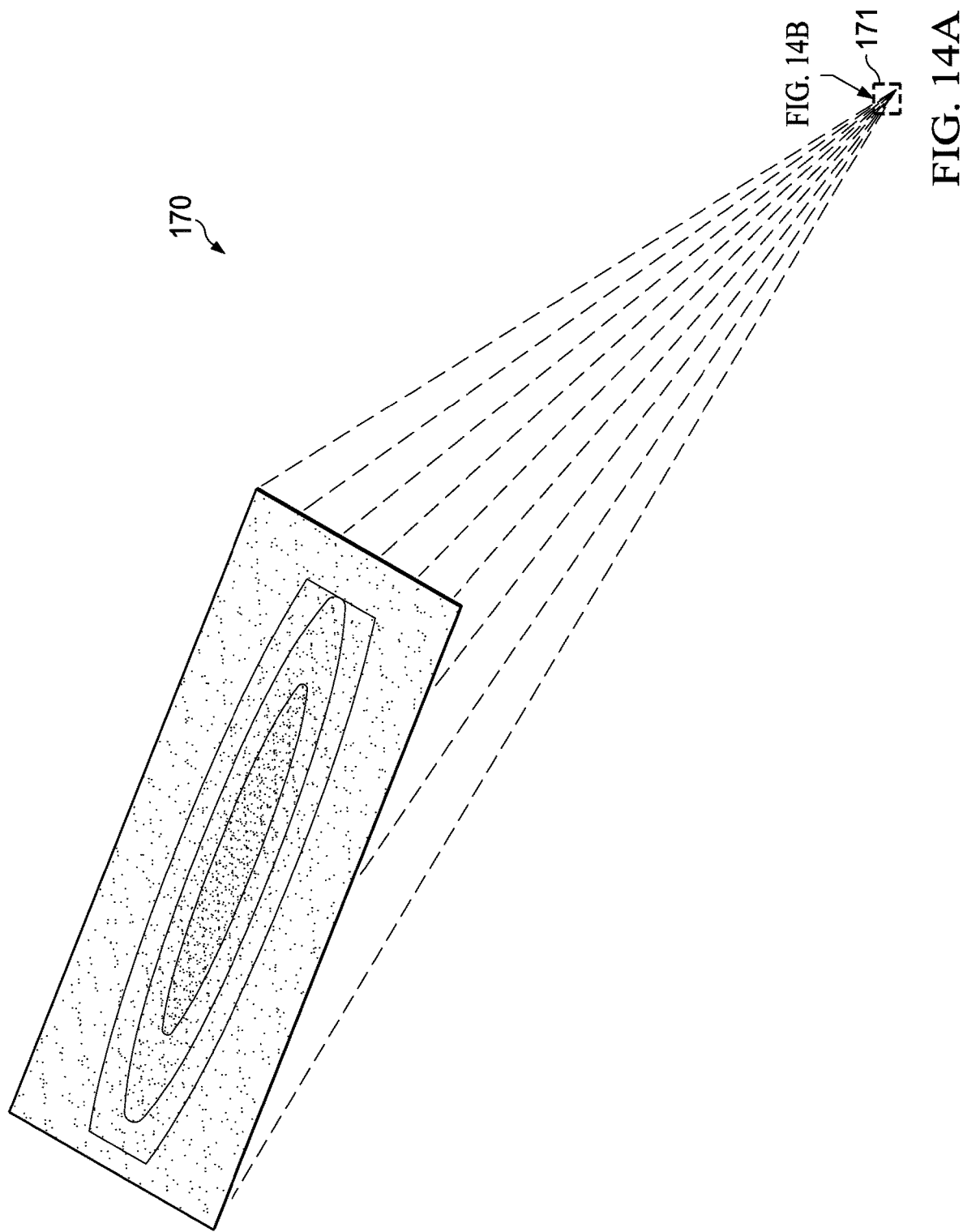

METHODS AND APPARATUS FOR ILLUMINATION WITH LASER MODULATED ADAPTIVE BEAM SHAPING

CROSS-REFERENCE TO RELATED APPLICATIONS

This application is a continuation of U.S. patent application Ser. No. 14/678,950 filed Apr. 4, 2015, which claims priority to U.S. Provisional Patent Application Ser. No. 62/017,483 filed Jun. 26, 2014, the entireties of which are incorporated herein by reference.

BACKGROUND

This relates generally to MEMS reflective devices, such as digital micromirror devices (DMDs), to project light for illumination. Applications of DMD projection include automotive headlamps, projection displays, spotlights, flashlights, aircraft lamps, marine lamps and other illumination and light beam applications (e.g., event lighting and stage lighting).

In certain applications, beam shaping and adaptive beam control are needed and/or desired in the projected light of an illumination system. In an example automotive application, the beam from an automotive headlamp should, if possible, bend to adapt the path ahead with the forward motion of the automobile. In this manner, the illumination beam will illuminate the path around curves so that the light beam illuminates the path the automobile is going to traverse. This is not possible with a fixed position headlamp. Further, the automobile headlamp should direct light away from oncoming traffic (or be "glare-free") while maintaining bright illumination for the driver. Conventional systems require the driver to turn OFF the high beam and rely only on lowered illumination ("low beam") when on-coming traffic approaches, or risk blinding the on-coming drivers due to glare in the eyes of the on-coming drivers.

FIG. 1 is a block diagram of an example conventional automotive headlamp system with beam steering. In FIG. 1, in a headlamp system 10 a conventional illumination source 14 such as a sealed beam lamp is mounted on a swivel that is driven by a motor 16. A control 18 receives inputs from the steering system, a vehicle speed sensor, and a vehicle height sensor, and the lamp 14 is pointed mechanically as the vehicle turns and moves. This conventional approach requires motors and moving parts in the automotive headlamps, making maintenance and repair more frequent and replacement very expensive. Further, the conventional approach illustrated in FIG. 1 often still requires the driver to operate the lamp in a "high beam" and "low beam" mode to adapt the beam to a "low beam" position when on-coming traffic approaches.

Another conventional approach to providing headlamps is to use DMD devices. Lighting with DMD projection offers the opportunity to provide bright and adaptive lighting solutions for many applications. Because the DMD array is "pixel addressable," the projected beam of light formed with a DMD device can be adaptively shaped to suit a variety of needs. For example, control circuitry can be used to adaptively shape the beam of light projected so as to avoid the eyes of oncoming drivers. Sensors and control circuitry can be used to automate this "glare free" function.

FIG. 2 is a block diagram of a conventional DMD illumination system using a DMD device. The system 20 of FIG. 2 is presented to further illustrate the problems of conventional approaches. In system 20, a single light source 21 and illumination optics 23 are used to direct light from the light source 21 onto the face of the mirrors 24 within a DMD device 22. The DMD device 22 is formed by micro-electromechanical system (MEMS) technology which is based in part on semiconductor device processing. A semiconductor substrate 26 is processed using semiconductor processing steps such as photolithography and other steps including deposition, patterning, etching and metallization steps. An array of micromirrors 24 is formed over the substrate 26. In an example process the micromirrors 24 are formed of aluminum and are mounted on a hinged mechanism. The micromirrors 24 are attached on a hinge and can be tilted using electronic signals applied to electrodes that control a tilt by pivoting the micromirrors about an axis. In an example DMD device, thousands and even millions of the micromirrors are formed in an array that forms a VGA, 720p or 1080p or even higher resolution imaging device, for example. When used in a lamp application, individual micromirrors 24 are positioned to reflect the light from the illumination optics 23 to a projection lens 28 and as shown in FIG. 2, a beam of light is projected out of the system 20.

The micromirrors 24 in FIG. 2 have three individual states, a first "on" state; second a flat or parked state, and finally an "off" state. In the "on" state, the micromirrors 24 in FIG. 2 are tilted in a first tilted position from the flat position, due to signals on an electrode that cause the hinge to flex, and in system 20 the micromirrors 24 are positioned to reflect incoming light from illumination optics 23 outwards to the projection lens 28. In the "off" state, the micromirrors 24 are tilted in a different tilted position to reflect the light away from the projection lens 28. A thermal "light dump" (not shown in FIG. 2) can be provided to collect the light not projected by the lens 28. By varying the tilted positions using electrical control signals, the micromirrors 24 can be used to direct light to the projection lens 28 or the reflected light can be reflected away from the projection lens 28. In addition to the "on" and "off" tilted positions, the micromirrors can be placed in a "flat" state. The flat state is a safe position the mirrors take when no power is applied to the DMD device.

FIG. 3 is a block diagram of the operation of a micromirror in a DMD projection system. In FIG. 3, in a projection system 30 a single illustrative micromirror 38 illustrates the various positions used for the micromirrors. In the "on" state, the micromirror 38 is at a first tilted position, for example at +12 degrees from the vertical or flat position. The illumination source 36 is angled at −24 degrees from the zero degree position, which is aligned with the projection lens 34. Because in reflection from a mirror, the angle of incidence (AOI) of the incoming light is equal to the angle of reflection (AOR) of the reflected light, for a +12 degree tilt, the −24 degree angle for the illumination source results in reflected light at the zero degree position as shown in FIG. 3. The cone of reflected light labeled "on state energy" shows the reflected light directed outwards from the micromirror 38 at the zero degree position. Other DMD devices may provide different tilt angles, such as +/−10 degrees, or +/−17 degrees. When the micromirror 38 is in the "on" state, the light from the illumination source 36 is reflected as the cone of light labeled "on state energy" at zero degrees into the projection lens 34. The projected light is then output from the system 30. The micromirrors can also be put in a "flat" state position, when the system is not powered, and the micromirrors can also be put in an "off" state. In the "off" state position, the micromirror 14 is at a second tilted position at an angle of −12 degrees from the flat position, and in the "off" state the light that strikes the micromirror is reflected away from the projection lens 34, and is not output from the system 30 but instead is output into a light dump 32. In conventional projection systems the flat position of the micromirror 38 is not used when power to the system is applied, but is instead used when the system is not powered. The flat position is sometimes referred to as a "parked" or "safe" position for the micromirror 38.

In forming an adaptive beam, certain of the mirrors in a DMD array can be tilted to the "off" position while other mirrors are tilted to the "on" position and reflect light to the projection lens. In this manner it is possible to shape the beam of light projected by the lens in FIG. 3. However, the mirrors in the "off" position direct light away from the lens, which is inherently inefficient, in that the light provided by the illumination source is only partially utilized. The unused light is directed to a "light dump" which collects it as thermal energy that then must be dissipated. Using a conventional illumination source with a DMD, even when the DMD is operated to adaptively shape the projected beam of light, is therefore inherently inefficient.

SUMMARY

An illumination system includes at least first and second laser illumination sources. A down converter material emits light when illuminated by one or more of the laser illumination sources. The first laser illumination source is arranged to illuminate only a first portion of the down converter material. The second laser illumination source is arranged to illuminate only a second portion of the down converter material. Control circuitry causes the first laser illumination source to adaptively vary a first intensity of illuminating the first portion of the down converter material, causes the second laser illumination source to adaptively vary a second intensity of illuminating the second portion of the down converter material, and causes the light modulator to allow a selected amount of the down converter material's emitted light to be projected from the system.

BRIEF DESCRIPTION OF THE DRAWINGS

FIG. 11 is a block diagram of an example arrangement of a DMD illumination system incorporating various arrangements described herein.

FIGS. 14A-C are a system diagram and corresponding expanded views of the operation of a headlight module in projecting a first pattern of illumination.

DETAILED DESCRIPTION OF EXAMPLE EMBODIMENTS

Figure 1:
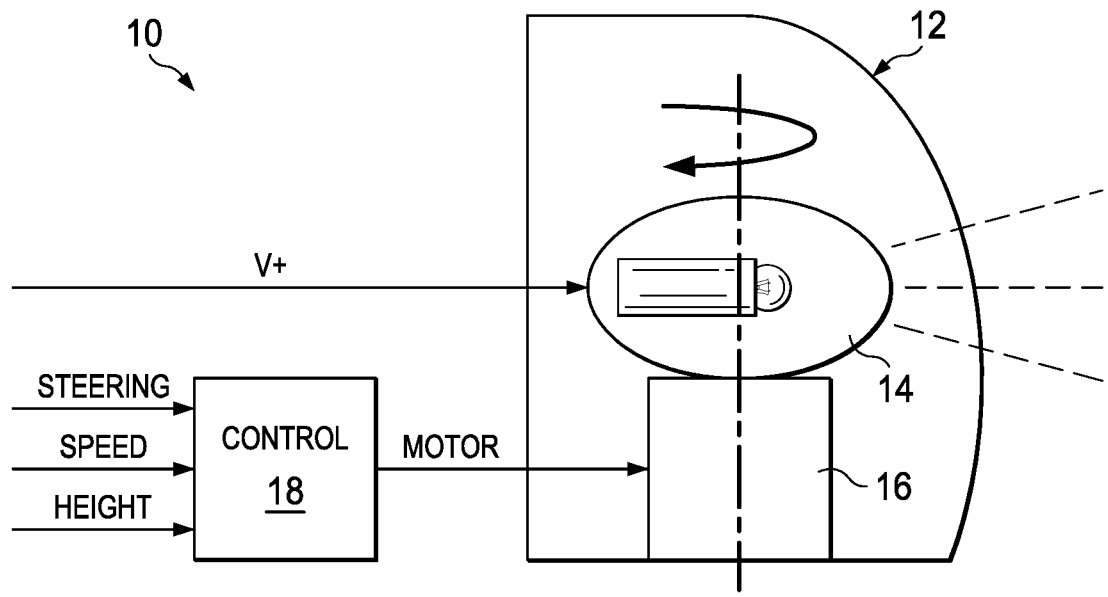
FIG. 1 is a block diagram of an example conventional automotive headlamp system with beam steering.
Figure 2:
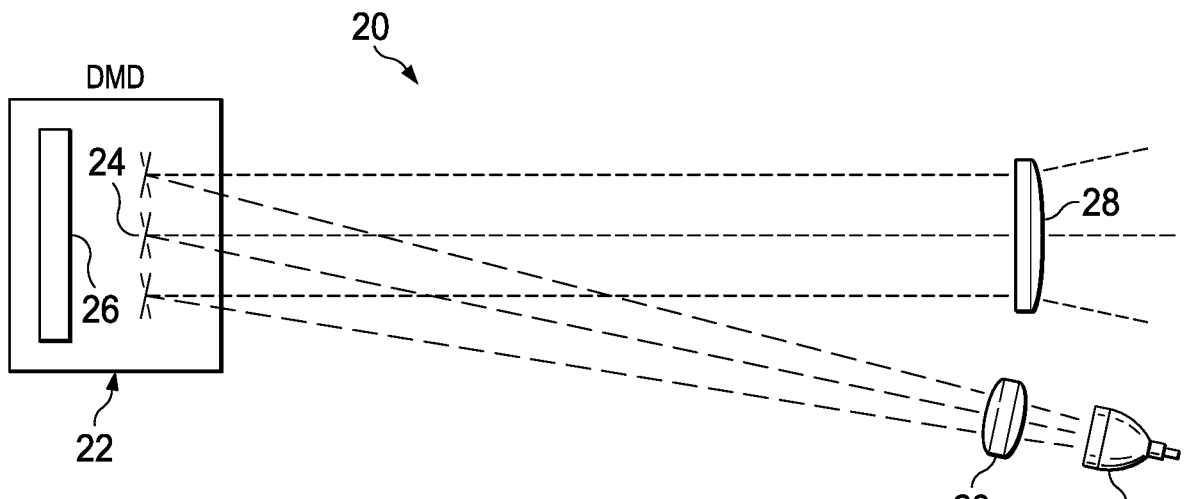
FIG. 2 is a block diagram of a conventional DMD illumination system.
Figure 3:
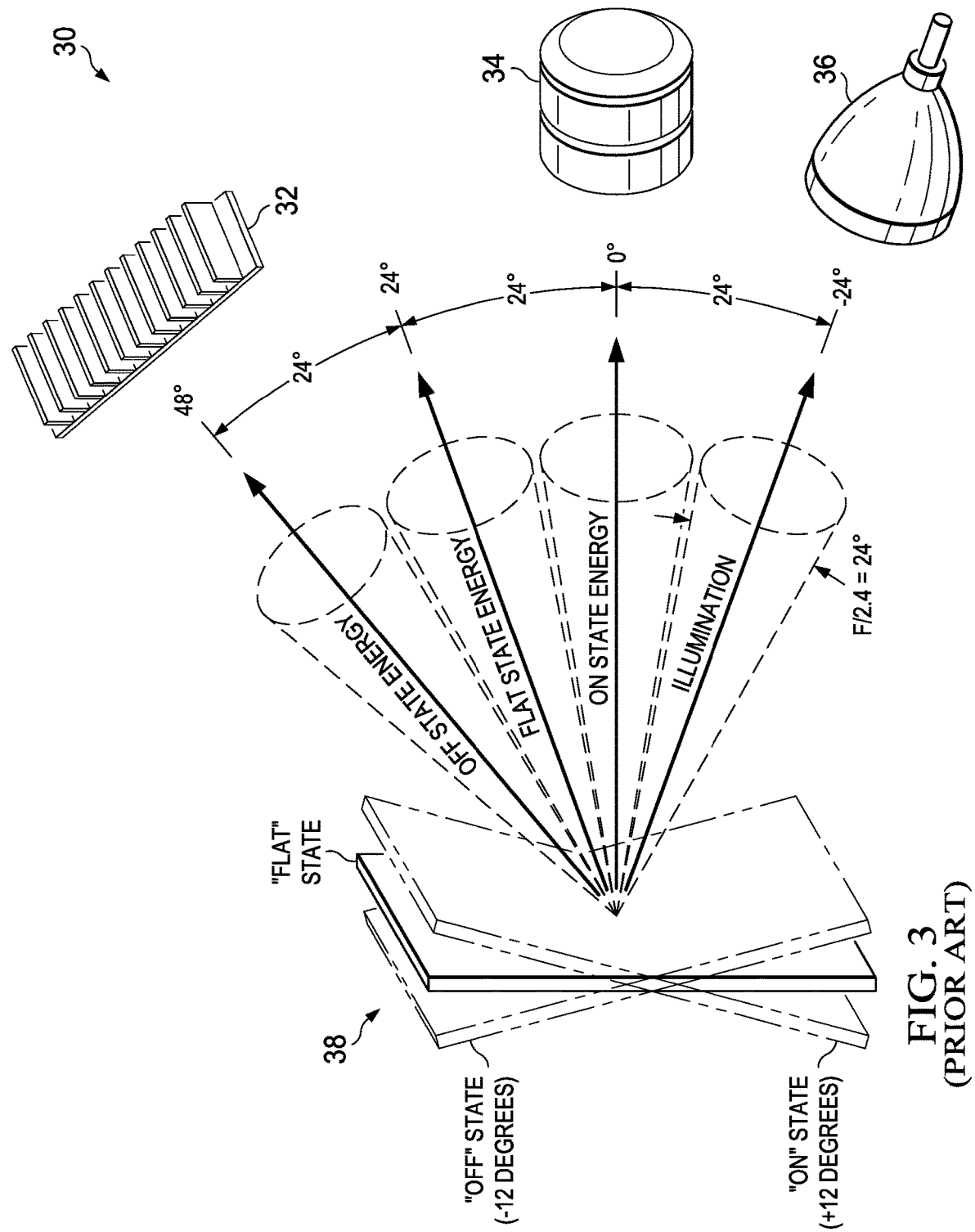
FIG. 3 is a block diagram of the operation of a micromirror in a DMD projection system.

Corresponding numerals and symbols in the drawings generally refer to corresponding parts unless otherwise indicated. The drawings are not necessarily drawn to scale.

In this description, the term "coupled" is not limited to "connected" or "directly connected," but may also include connections made with intervening elements, and additional elements and various connections may exist between any elements that are "coupled."

Example embodiments include a DMD lighting apparatus with excellent brightness at the output that is robust, reliable and simple to implement. In the various arrangements, a multiple laser source illumination system is used. Two or even more laser illumination sources can be used in various alternative arrangements.

Figure 4:
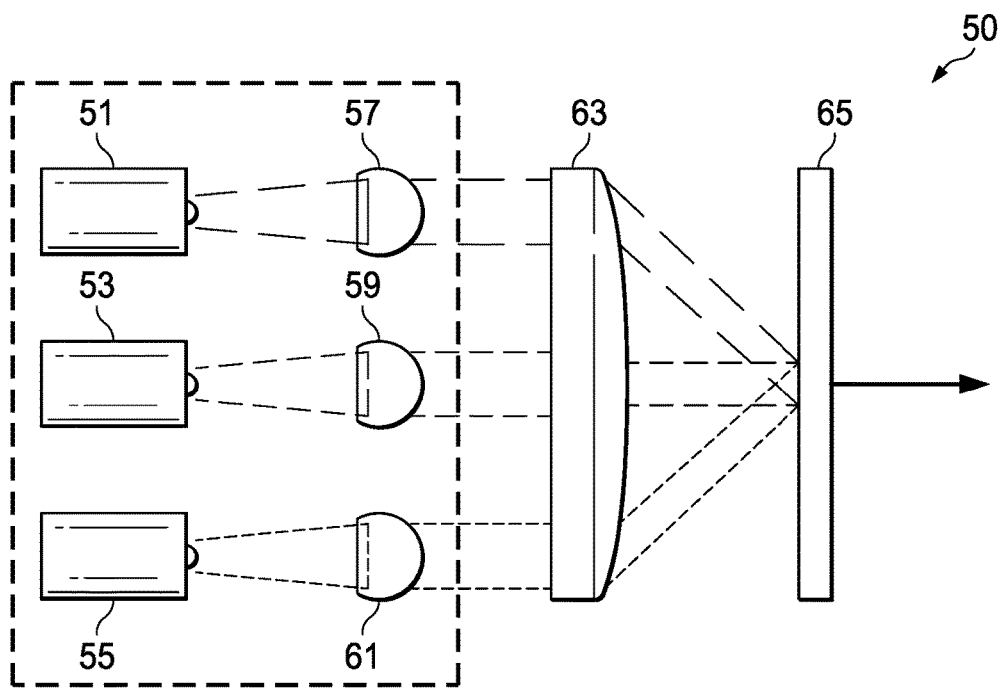
FIG. 4 is a block diagram of an arrangement including multiple laser illumination sources.

FIG. 4 depicts in a simple block diagram an illumination system 50 having multiple laser illumination sources 51, 53 and 55, for example. In this particular example, three groups of laser illumination sources are used, however the arrangements described herein are not so limited. In an example, the groups of laser illumination sources 51, 53, and 55 can output light that is visibly blue, e.g., that has a wavelength between 450-495 nm. Alternative arrangements can include using violet laser sources, e.g. laser sources having an output light with a wavelength from 380-450 nm. In system 50, a phosphor device 65 is formed of a material that emits photons in response to being illuminated, that is phosphor 65 exhibits luminescence. The phosphor 65 can be transmissive material or reflective material. The phosphor 65 acts as a down converter by outputting white light that is different from the light that excites the phosphor. Example materials than can be used for phosphor 65 include "YAG" compositions including yttrium, aluminum and garnet in a compound. In one example the phosphor material 65 has a chemical composition of $Y_3Al_5O_{12}$ and may be formed from application of powders, and the phosphor material can be provided as a powder for coating a base material. The YAG phosphor will emit yellow photons when illuminated. When the phosphor 65 is impacted by photons, light will be emitted with a wavelength between 510-610 nm, and when illuminated with a blue laser, the resulting light (which includes both the yellow and the blue light) is visibly white. Other materials that are used for phosphors include aluminate, nitride and silicate based coatings. System 50 has three groups of lasers 51, 53 and 55, and the laser output is directed through collimators 57, 59 and 61 to make the laser light beam less divergent. Each group can include one or several laser sources. Then, using a beam shaper 63, the light from the laser sources 51, 53 and 55 is directed on to the surface of the phosphor 65. The resulting white light is then used to illuminate the mirrors in a DMD device (not shown in FIG. 5).

By varying the light distribution levels of the illumination of the individual laser sources 51, 53, 55 in system 50, an adaptive illumination can be accomplished. The light beams overlap at the phosphor partially and the overlapping beams form a pattern that can be adapted. Use of the arrangements described herein enables adaptive beam shaping that can be efficiently performed. For example, if a portion of a DMD is going to be tilted in the "off" position so as to shape the projected beam of light, the light distribution level of the laser illumination directed to that portion of the DMD array can also be reduced, so that the light impacting these micro mirrors is lessened and the light that does impact the mirror array is directed to the projection lens, with less light directed to a "light dump." Efficiency is thereby improved and by adding additional control features to the system the adaptive beam shaping can also be better tailored for a particular application. Using the laser sources with varying light distribution levels an initial beam shaping can be performed, and this pattern can be further fine-tuned by adaptively operating the micromirrors in the DMD device, which are individually addressable as is further described below.

In one arrangement, the three laser sources 51, 53, 55 shown in FIG. 5 can be positioned in an arrangement corresponding to the left, center and right of a beam to control the horizontal light distribution of the resulting beam. This arrangement can be accomplished using the three laser sources as described above, or in an alternative arrangement, using laser sources in a group for each laser source that can be arranged in various ways including an array or grid. In another alternative arrangement described herein, the laser sources can be arranged vertically to control light distribution at the upper, center and lower portion of a beam, for example. Other arrangements using multiple laser sources are possible.

Figure 5A:
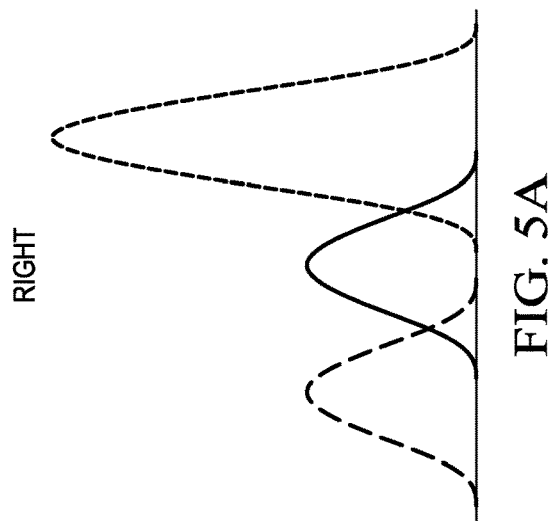
FIGS. 5A-5C are graphs of intensity patterns that can be obtained using the arrangements shown in FIG. 4.
Figure 5B:
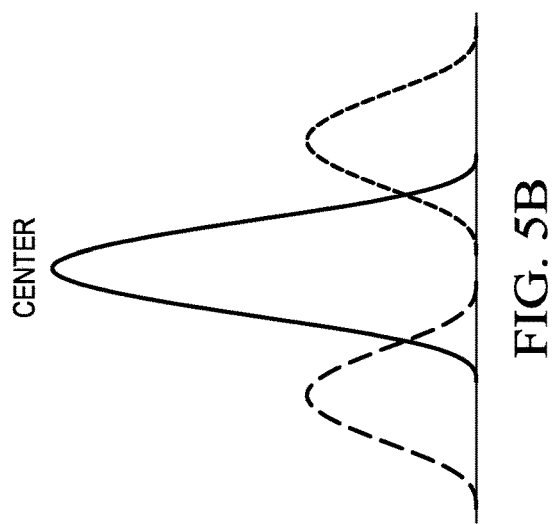
Figure 5C:
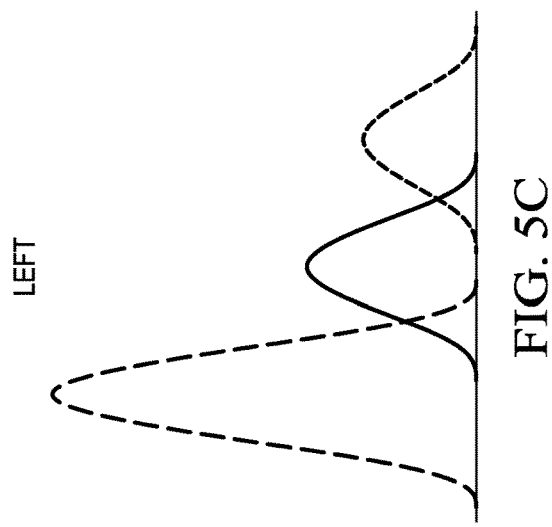

FIGS. 5A-5C illustrate in graphs light distributions that can be obtained using the arrangements shown in FIG. 4. In FIG. 5A, the graph labeled "RIGHT" illustrates a beam shaping to form a beam that has maximum intensity on the right side, and has a lower intensity at the center and left sides. As shown in FIG. 5A, the optical output of the laser source that is at the right side of the light path is high, while the optical output of the left and center position laser sources is reduced. The pattern generated at the phosphor in FIG. 4 will reflect the laser output levels and this pattern will then be directed onto the DMD device to further shape the beam that is eventually projected by the system.

In FIG. 5B, the graph labeled "CENTER" illustrates the use of varying optic power levels to create a pattern of light at the phosphor that has a large intensity in a center portion and smaller intensities to the right and left. In this example, the laser sources that correspond to the center of the light beam radiate at higher optical power than the laser sources that correspond to the right and left sides of the light beam that strikes the phosphor in FIG. 4.

In FIG. 5C, the graph labeled "LEFT" illustrates the use of varying the optical power of the laser sources to create a pattern of light at the phosphor in FIG. 4 that has a large intensity at the left side, with reduced intensity at the center and right portions. Again the intensity of the pattern is created by varying the illumination from the laser sources in FIG. 4.

The light distribution variation can be accomplished in one example arrangement by varying current that is used to drive the groups of laser sources. 51, 53, 55 in FIG. 4. As the current to a particular laser source increases, the output power from that laser source will correspondingly increase. A decrease in output power can also be accomplished by decreasing the current to the laser source. In another approach described herein, the laser source output power can also be controlled using a pulse width modulation approach. In this approach, the duty cycle of a power supply to the individual laser sources can be varied. For increased optical power, the amount of time a particular laser source is on can be increased by increasing the pulse width of a clocking signal used to supply the power to the laser source or to control the laser source. Similarly, reducing the pulse width of the clocking signal can reduce the power that is output by a laser source. In arrangements described herein, the pattern at the phosphor is then used in combination with adaptive control of the addressable pixel elements in the DMD to further shape the resulting beam.

Figure 6:
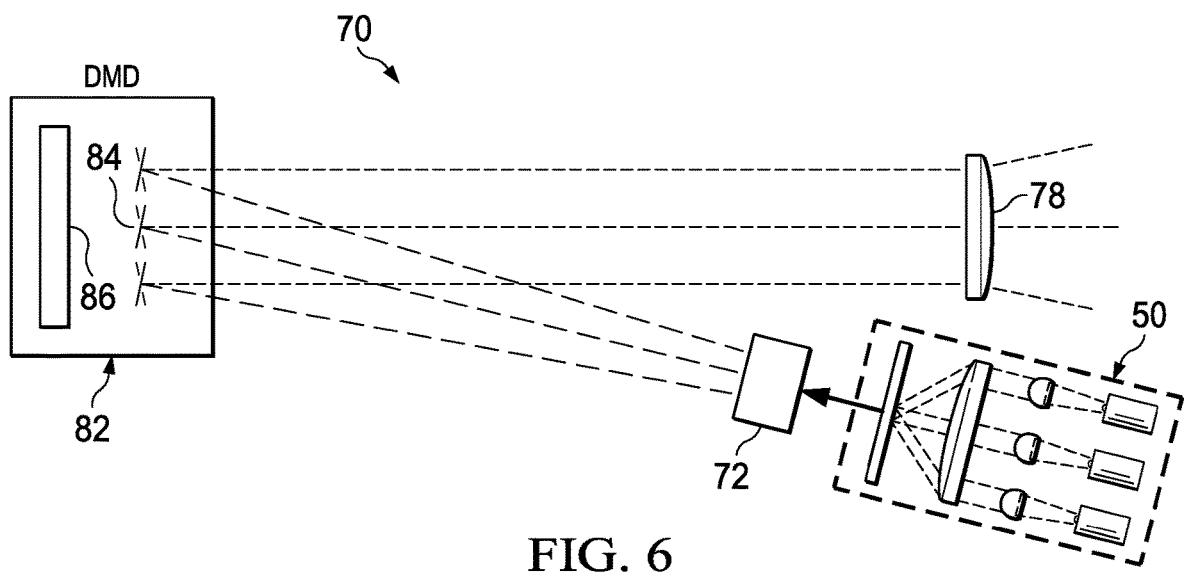
FIG. 6 is a block diagram of a DMD illumination system that incorporates aspects of examples described herein.

FIG. 6 is a block diagram of an arrangement DMD illumination system that incorporates aspects described herein. In FIG. 6, in a system 70, a digital micromirror device DMD 82 includes a substrate 86 and an array of micromirrors 84. There may be thousands or millions of micromirrors in a rectangular or square micromirror array in DMD 82, further the micromirrors are individually addressable, and each micromirror can tilt to a first position and a second position, responsive to control signals. Each micromirror 84 also has a third untilted, or flat, position. A projection optics element 78 such as a lens is used to collect and output the reflected light from the system 70. In an example arrangement for a particular application, the lens 78 may be part of an automotive headlamp assembly. In the illustrative system 70, a laser illumination system (such as system 50 of FIG. 4) is used to illuminate the micromirrors in DMD 82. As described above, multiple laser illumination sources are arranged and controlled to form patterns of intensity on a phosphor to form a beam. Optics 72 are imaging optics that are used to relay the light distribution formed at the phosphor device onto the micromirrors 84. The optics used can be formed in a variety of ways so long as the light distribution pattern developed at the phosphor is preserved and presented to the digital micromirror devices. In another aspect described herein that provides additional capabilities, additional beam shaping can be performed by selectively tilting the addressable micromirrors in the DMD to turn individual pixels "on" and "off." A dynamic beam shaping can thus be performed by using the optical power controls of the laser illumination sources in the illumination system 50 in conjunction with the positions of the addressable DMD elements in DMD 82.

Figure 7:
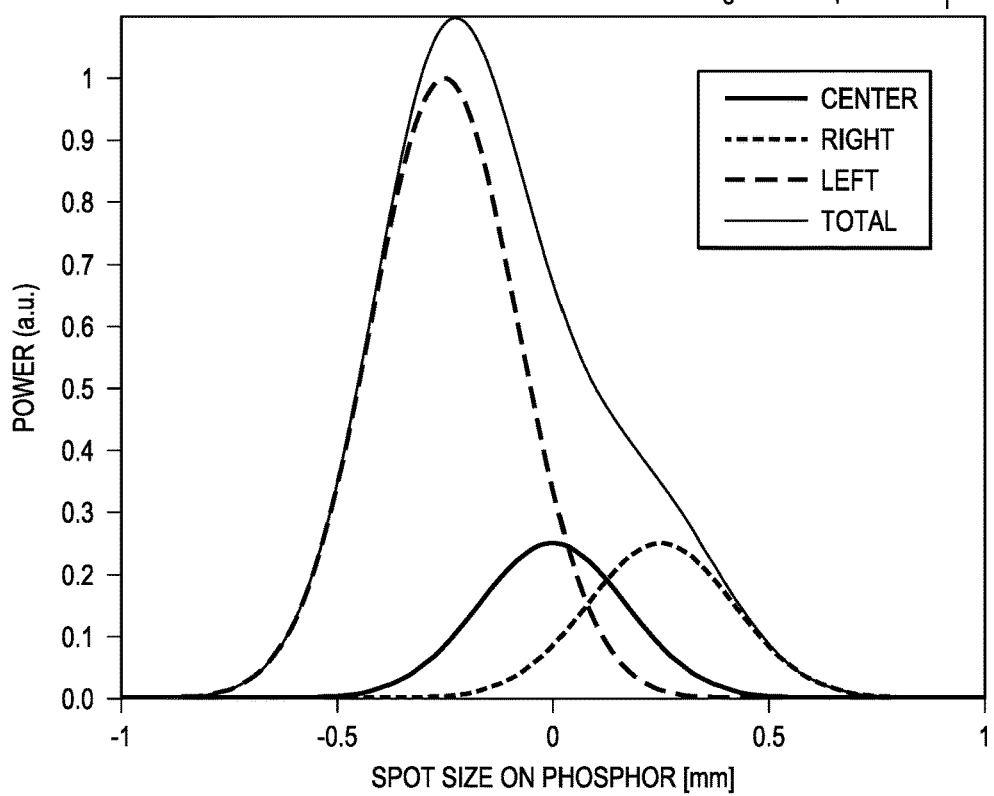
FIG. 7 is a graph of the intensity obtained using arrangements described herein to form a predetermined spot pattern.

FIG. 7 depicts in a plot the power (on the vertical axis) and the laser spot size (on the horizontal axis) for an example light distribution to produce a beam that is brighter on the left side. In the graph of FIG. 7, the three groups of laser sources left, center and right such as shown in FIG. 4, are shown with varying optical power to form a desired pattern at the phosphor. The uppermost line plots the combined total power for the three laser sources. As can be seen from the graph, the peak of the power is to the left of the center (at position 0 on the horizontal axis) and extends to the center and right with falling power from the peak left of the center. The second line from the top corresponds to the spot formed by the left laser source, and is fully powered at a normalized level of "1." The center and right laser sources are powered at 0.25 levels, and the total power curve falls away from the left side to the center and on to the right side.

Figure 8:
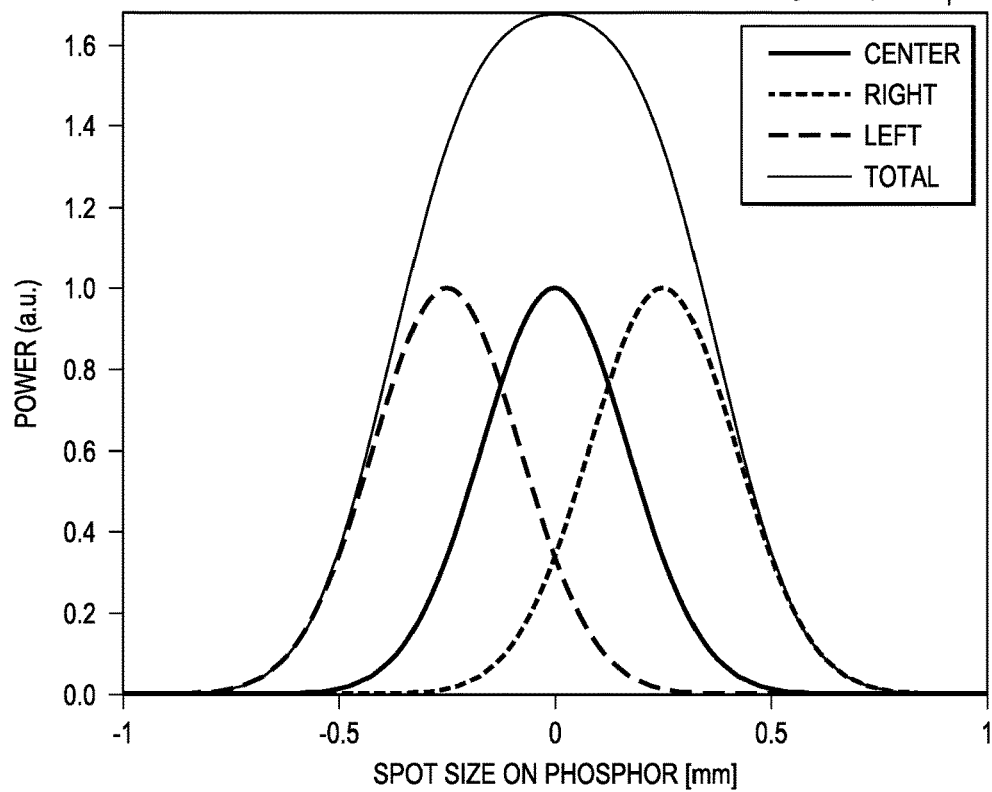
FIG. 8 is another graph of the intensity obtained using arrangements described herein to form an additional predetermined spot pattern.

FIG. 8 depicts in a plot the power (plotted on the vertical axis) and laser spot size on the phosphor (the spot size is plotted on the horizontal axis) for another example light distribution pattern. In this example, the pattern is formed with the beam at maximum power in the center. This is accomplished by providing equal power for each of the three laser sources, the left, center and right laser source such as those in FIG. 4. The upper most curve in FIG. 8 illustrates the total power achieved, which is the sum of the power from the left, center and right laser sources, each at a maximum power level normalized to "1" in the plot. The maximum power in this example is in the center of the phosphor area (at 0 on the horizontal axis) and falls away in both the left and right directions slowly from the center.

Figure 9A:
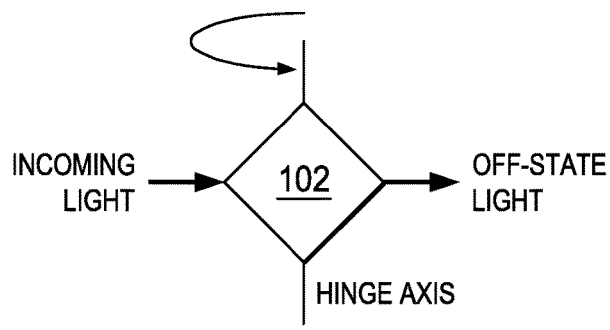
FIG. 9A illustrates the operation of a VSP micromirror for use with the various arrangements described herein.
Figure 9B:
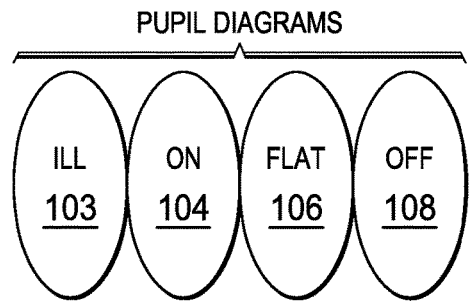
FIG. 9B is a pupil diagram of the operation of the VSP micromirror of FIG. 9A.

FIGS. 9A and 9B depict the operation of a first type of an example digital micromirror device 102 that can be used with the arrangements described herein. FIGS. 9A and 9B illustrate operation of a very small pixel (VSP) digital micromirror device that is available from Texas Instruments Incorporated. VSP micromirrors pivot on a single axis and can be arranged in either diamond or Manhattan orientations. FIG. 9A shows a diamond oriented micromirror 102 receiving illumination from one side. The micromirror 102 can be tilted from −12 degrees to +12 degrees, for example. In additional arrangements, other tilt arrangements such as +/−10 degrees can be used. FIG. 9B shows a pupil diagram corresponding to the illumination, on, flat and off states of the micromirror of FIG. 9A. In FIG. 9B, the pupil diagram illustrates the direction light is reflected from the micromirror in the on, flat and off positions. Also, a pupil 103 indicates the position of the illumination sources. Position 104 illustrates the reflected light when the micromirror is tilted in the "on" position. In this position the light is directed to a projection lens and out of the system. Position 106 shows the "flat" position. In this position, the micromirror is flat and not powered. Position 108 shows the "off" position. In this position, the light incident on the micromirror 102 is directed to away from the projection system. In this instance, the light is not used to form the projected light beam output by the projection system. A light dump or heat sink can be used to collect the energy from the light directed away from the projection system.

Figure 10A:
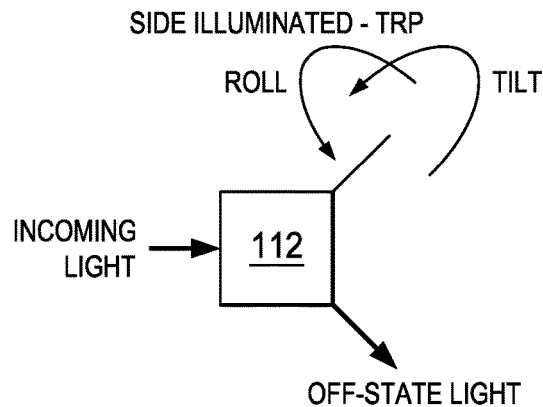
FIG. 10A illustrates the operation of a TRP micromirror for use with the various arrangements described herein with side illumination.
Figure 10B:
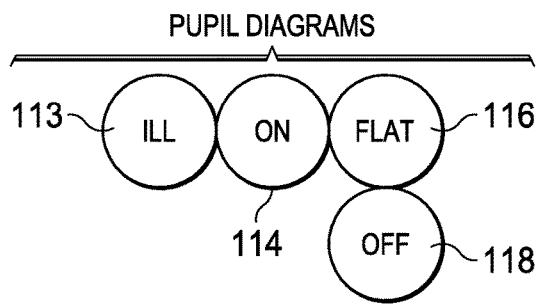
FIG. 10B is a pupil diagram of the operation of the TRP micromirror of F 10A.

FIGS. 10A and 10B depict the operation of a second type of digital micromirror device 102 that can be used with the arrangements described herein. FIGS. 10A and 10B show the operation of a tilt and roll pixel ("TRP") micromirror device with side illumination. TRP micromirror devices are available from Texas Instruments Incorporated and provide high resolution in a smaller area, and using lower power, than VSP micromirror devices. FIG. 10A illustrates the TRP micromirror device 112. FIG. 10B shows the pupil diagram for three positions of the TRP micromirror 112. Also, the position of the illumination sources is shown as 113. In operation, the TRP micromirror 112 can tilt to an "on" position or roll to an "off" position in response to control signals. The TRP micromirrors have a complex motion along a diagonal axis that tilts in one direction and rolls in another direction. Accordingly, as shown in the pupil diagram, when the TRP micromirror 112 is in the "'on" position, the incident light is directed to the left, when in the flat position, the incident light is directed to the center and when in the "off" position, the incident light is directed downwards. In a projection system, when the TRP micromirror 112 is in the "on" position the incident light will be directed to a projection system to form the beam output by the illumination system. When the TRP micromirror 112 is in the "flat" position, the micromirror is not powered. When the TRP micromirror 112 is in the "off" position, the incident light is directed away from the projection system and is not part of the beam projected by the illumination system. In this position the incident light can be reflected to a "light dump" or thermal sink.

Figure 10C:
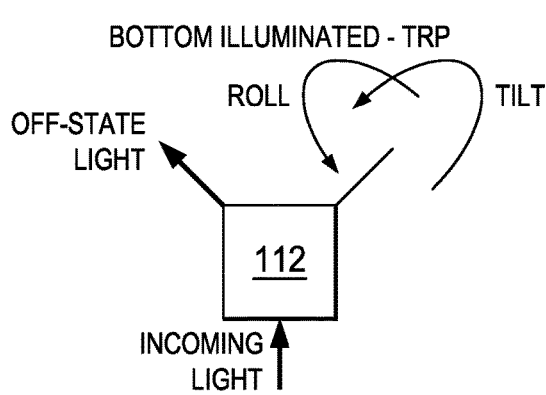
FIG. 10C illustrates the operation of a TRP micromirror for use with the various arrangements described herein with bottom illumination.
Figure 10D:
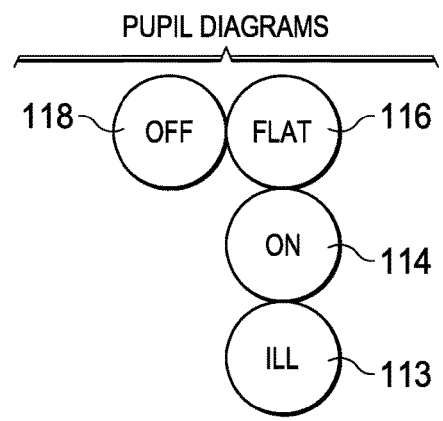
FIG. 10D is a pupil diagram of the operation of the TRP micromirror of FIG. 10C.

FIGS. 10C and 10D illustrate the operation of the same micromirror device, a TRP micromirror device, with a bottom illumination arrangement. In FIG. 10C, the illumination is directed to the DMD 112 from the bottom. In FIG. 10D, a pupil diagram illustrates the position of the illumination source 113. The three tilt positions 114, 116, 118 illustrate the reflected light from the DMD 112 when the mirrors are in the ON, 114, FLAT, 116, and OFF, 118, positions using bottom side illumination. In the ON pupil position the light from the illumination source, which is positioned beneath the TRP device, is reflected from the DMD to a projection lens system. In the OFF pupil position, the DMD mirrors are tilted to reflect the light from the bottom illumination sources away from a projection lens system, and into a light dump or heat sink. The FLAT position indicates in the pupil diagram when the DMD mirrors are not tilted.

FIG. 11 is a block diagram of a DMD illumination system incorporating various arrangements described herein. FIG. 11 depicts portions of an illumination system. Illumination system 120 can be used to form an automotive headlamp, as an example. Other applications can be addressed by use of the illumination system 120, including without limitation, illumination lamps for marine, home, aviation, commercial buildings and outdoor spaces, spotlights, theatrical and stage lighting, handheld, wearable and portable lamps. In FIG. 11, groups of laser sources 122, 124 and 126 are positioned to direct laser outputs onto a phosphor 136. In an example arrangement the laser sources output visibly blue light, and the phosphor 136 emits visibly yellow light in response to the incident blue light, the resulting light is therefore visibly white. The phosphor 136 can be reflective or transmissive material. The light distribution pattern at the phosphor 136 is determined by the overlapping outputs of the outputs of the laser sources 122, 124, 126 and as described above, by adjusting the individual optical power levels of the laser sources, can be adaptively adjusted to form different intensity patterns at the phosphor 136. An optical imaging lens or system 138 then transfers the pattern output at the phosphor 136 to the micromirrors of a digital micromirror device 142. The incident light strikes the surfaces of the micromirrors and is reflected to form a beam 146 that is input to a projection system (not shown in FIG. 11) and output from the projection system as described above.

In the example illustrated in FIG. 11, all of the mirrors in the DMD 142 are positioned in the "on" position and thus all of the incident light received by the DMD is output to the projection system. For example, this arrangement can correspond to a centered beam example where the light beam is output with the highest intensity at the center of a headlamp.

Figure 12:
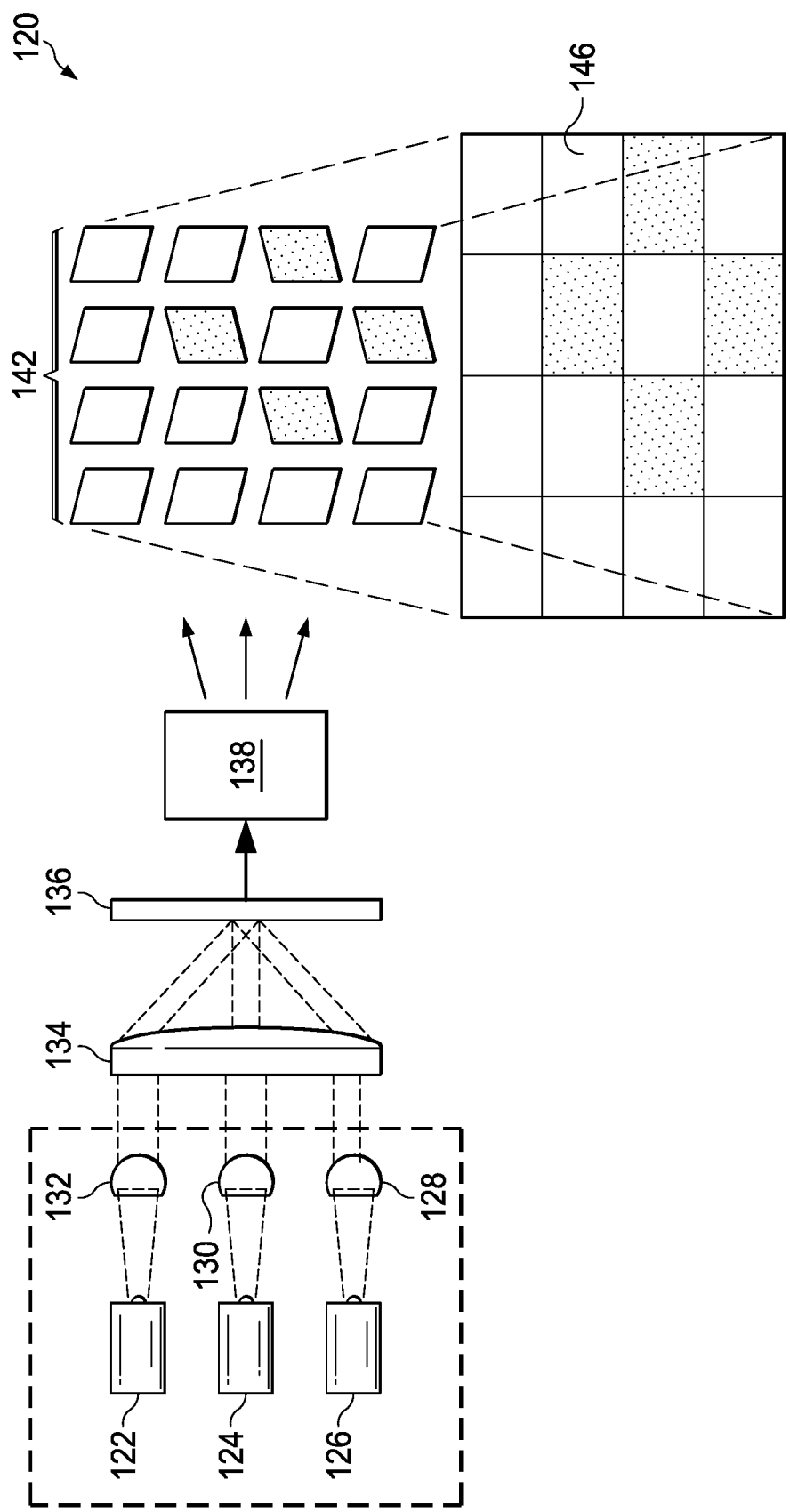
FIG. 12 is a block diagram of the operation of a DMD illumination system incorporating arrangements described herein to perform adaptive beam shaping.

FIG. 12 is a block diagram of the operation of a DMD illumination system incorporating arrangements described herein to perform adaptive beam shaping. FIG. 12 illustrates the system 120 of FIG. 11 with a different configuration to illustrate the use of beam shaping in the DMD. In FIG. 12, the laser sources 122, 124 and 126 again correspond to the left, center and right groups of laser sources, such as described above. In an alternative arrangement described herein, the three groups of laser sources can also correspond to a vertical arrangement and can be arranged as an upper, center and lower position laser source, respectively. In additional alternative arrangements described herein, the three laser sources can be replaced with more laser sources. These laser sources can be arranged in a grid or array arrangement, for example. Collimators 132, 130, 128 are associated with the laser sources and receive the laser outputs; and the collimators operate to make a non-divergent beam for each of the three (in this example) laser sources. Beam shaper 134 again directs the three beams to a phosphor 136. The pattern at the phosphor 136 is then transmitted by illumination optics 138 and presented to the DMD device 142. The output is shown projecting away from the DMD at plane 186.

In FIG. 12, certain micromirrors in the DMD 142 are shown in the "off" position while the remaining micromirrors are in the "on" position. The micromirrors in the "off" position in FIG. 12 will not transmit the incident light from the laser illumination sources to the projection system, thereby further shaping the resulting beam output by the projection system. In this manner, the intensity pattern output from the laser illumination sources can be further adapted and shaped using the individually addressable pixel elements of the DMD. In an automotive headlamp application example, a portion of the micromirrors can be placed in the "off" position when traffic is detected in an oncoming lane, thereby creating a "glare free" headlamp where the driver of an oncoming car does not have the illumination directed at his eyes. This beam shaping can be done adaptively and automatically using sensors and control circuitry to adapt the headlamp beam shape without the need for an action by the driver, freeing the driver to maintain their attention on the roadway and on operating the vehicle. Alternatively, in a further alternative arrangement described herein, a manual switch such as a foot feed switch could be used to switch the headlamp into a "low beam" or "glare free" mode when the driver observes a vehicle approaching in an oncoming lane. In one arrangement for an automobile headlamp, the beam is shaped, so that a "high beam" brightness is provided in the direction the car is traveling, adaptively shaping the beam as the car turns, while a "glare free" adaptive shaping is also performed when oncoming traffic is detected, reducing the beam intensity and directing it away from the eyes of drivers in the opposing lanes, even while maintaining the high intensity elsewhere. In this manner a "glare free high beam" feature can be obtained, the beam intensity remaining high for the areas of interest away from the oncoming traffic, the beam shape being adaptively modified as the vehicle turns over curves, while still avoiding glare in the eyes of drivers in an oncoming lane of traffic.

Figure 13:
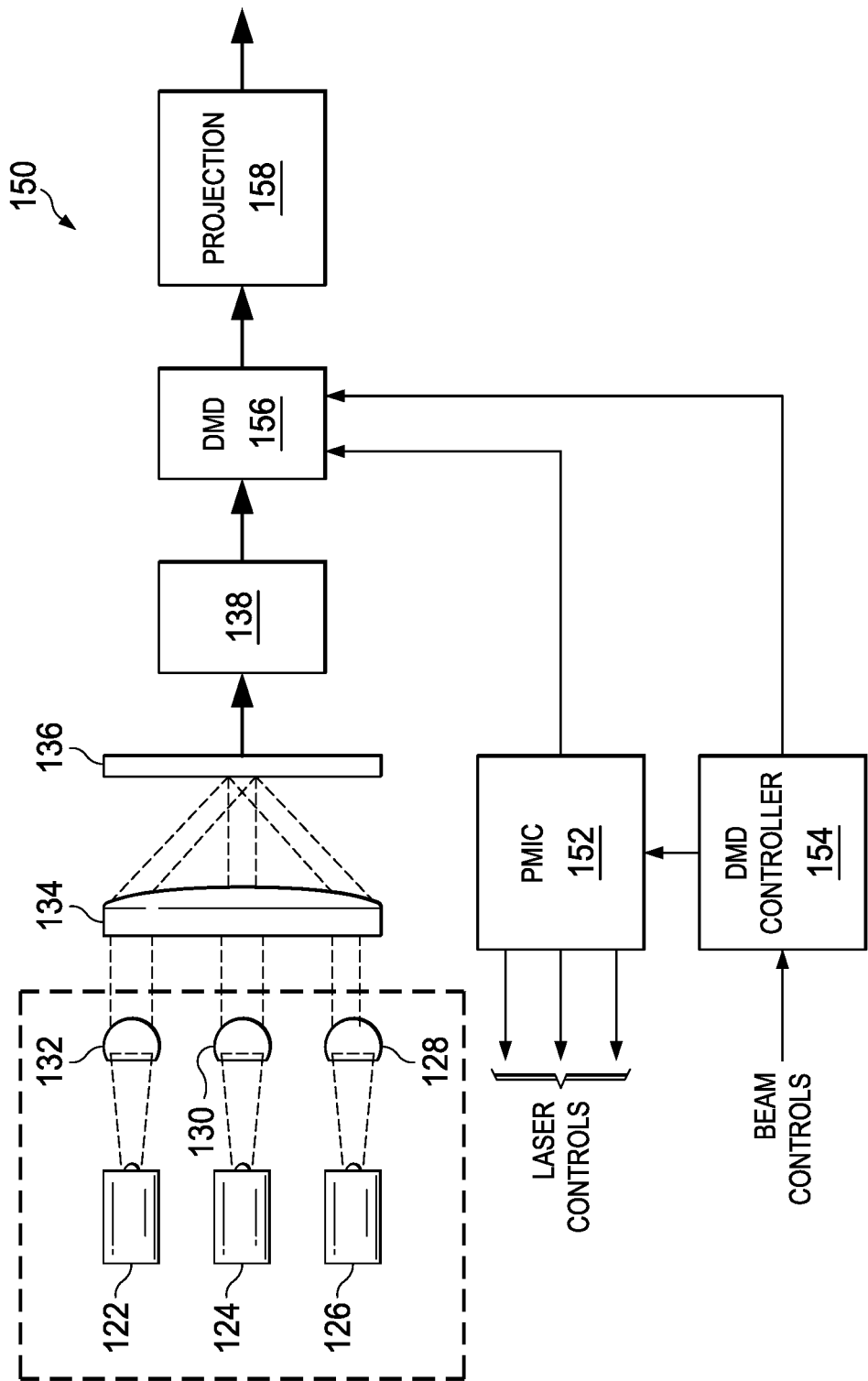
FIG. 13 is a block diagram of an arrangement of a DMD illumination system incorporating various arrangements described herein.

FIG. 13 is a block diagram of an arrangement of a DMD illumination system 150 incorporating various arrangements described herein. In FIG. 13 the groups of laser illumination sources 122, 124, 126 are again shown positioned to project light to collimators 132, 130, 128, and the collimators operate to make the laser output light non-divergent as it is input to the beam shaper 134. The beam shaper 134 then directs the laser output light onto the phosphor 136, where the phosphor emits light with the incident light from the lasers to form light with an intensity pattern corresponding to the laser intensities. The light is then transferred by illumination optics 138, preserving the laser intensity patterns, to the DMD 156.

In FIG. 13, DMD 156 is controlled by an integrated circuit or module 154 labeled "DMD Controller," which provides image data to the addressable pixels (the micromirrors) in DMD 156. A power management circuit 152, which can also be implemented as an integrated circuit or module, is coupled to signals from the DMD controller 154 and outputs signals labeled "LASER CONTROLS" in FIG. 13 that control the intensities from the laser sources. The power management IC 152 can also control the power to the DMD 156. Alternatively the power to the DMD 156 can be controlled by the DMD Controller 154. The DMD Controller 154 also receives as input signals labeled "BEAM CONTROLS".

The DMD Controller 154 may be, in one example arrangement, implemented as a DMD controller component that is specifically provided for use with a DMD device. Texas Instruments Incorporated offers various DMD controllers, such as the DLPC300 controller, to control the DLP3000 DMD device (also available from Texas Instruments Incorporated).

Alternative implementations for the DMD Controller 154 include controllers implemented as component parts, such as commercially available DSPs, microprocessors, microcontrollers and alternatives, such as integrated or user programmable solutions (e.g., FPGAs, ASICs, CPLDs and state machines). The controller can include firmware or software, or can be a pure hardware implementation. The controller 154 provides control signals to both the DMD device 156 in FIG. 13, and provides control to the power management IC PMIC 152, which provides the on and off signals to the laser illumination sources 122, 124, and 126.

In operation, in this example system 150, the DMD 156 has individually addressable micromirrors that are arranged to reflect light in two tilted positions. The first tilted position, which corresponds to the "on" state described above, is arranged so that light from the illumination optics 138 strikes the face of the DMD micromirrors, and is reflected out to the projection system 158.

In the example arrangement of FIG. 13, in operation, the laser illumination sources 122, 124, and 126 can be controlled by DMD controller 154 and the power management IC 152 to be pulsed on and off in a synchronous operation with pulse width modulation used to control the laser intensities. In an arrangement described herein, the pulses to the laser illumination sources can be operated in conjunction with the tilting operations of the DMD 156. The efficiency of the system 150 can be increased over conventional solutions because the illumination from laser sources 122, 124, and 126 is provided in coordination with the tilting operations of the DMD 156 so that the light directed away from the projection system 158, and into a light dump, is reduced or eliminated.

In another alternative arrangement, the laser illumination sources 122, 124 and 126 may be left on continuously and not pulsed, and current levels from the signals output by the power management IC 152 can be used to control the laser intensities. This alternative arrangement uses an approach that is simpler in terms of control signals needed.

Figure 14B:
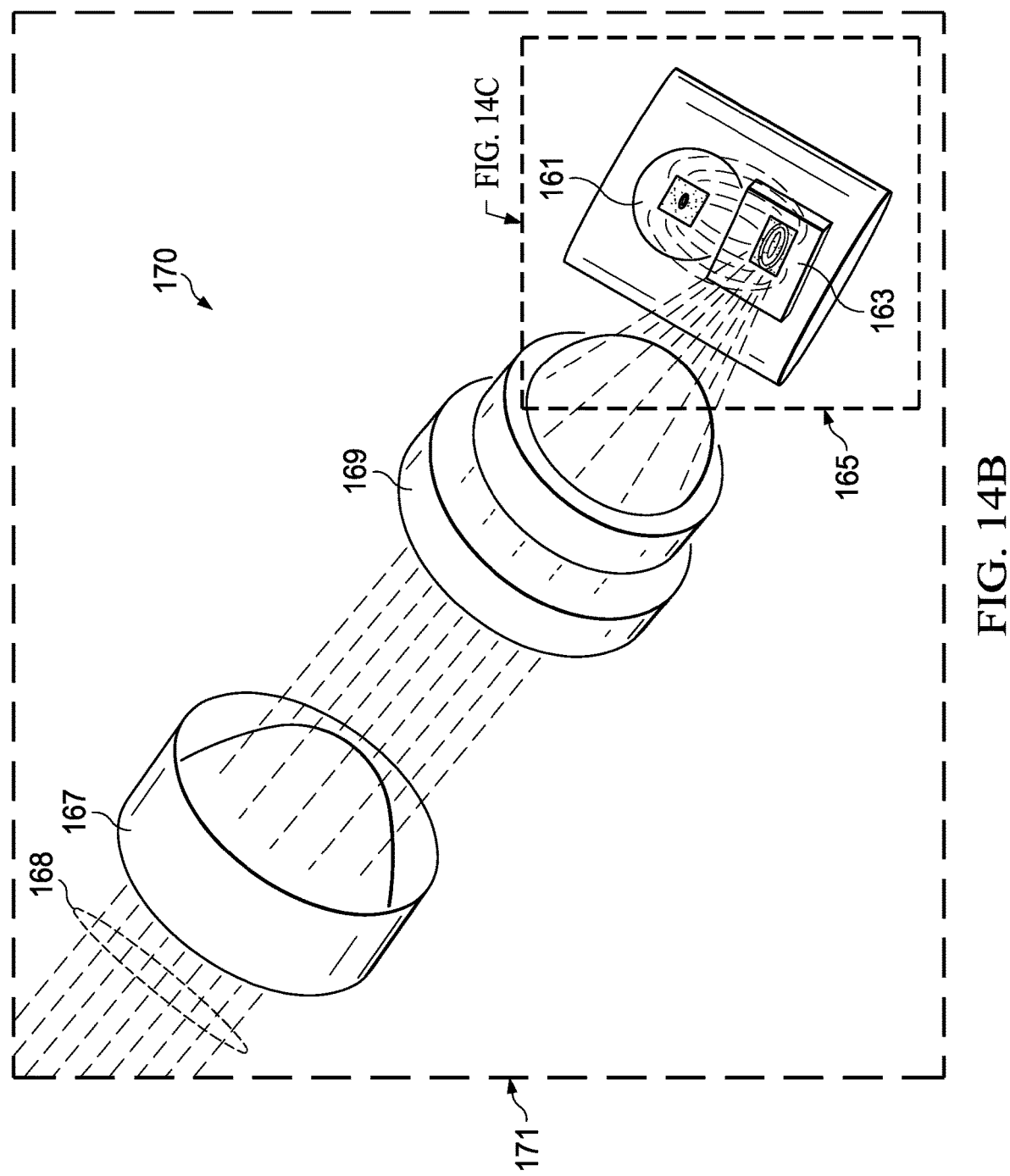
Figure 14C:
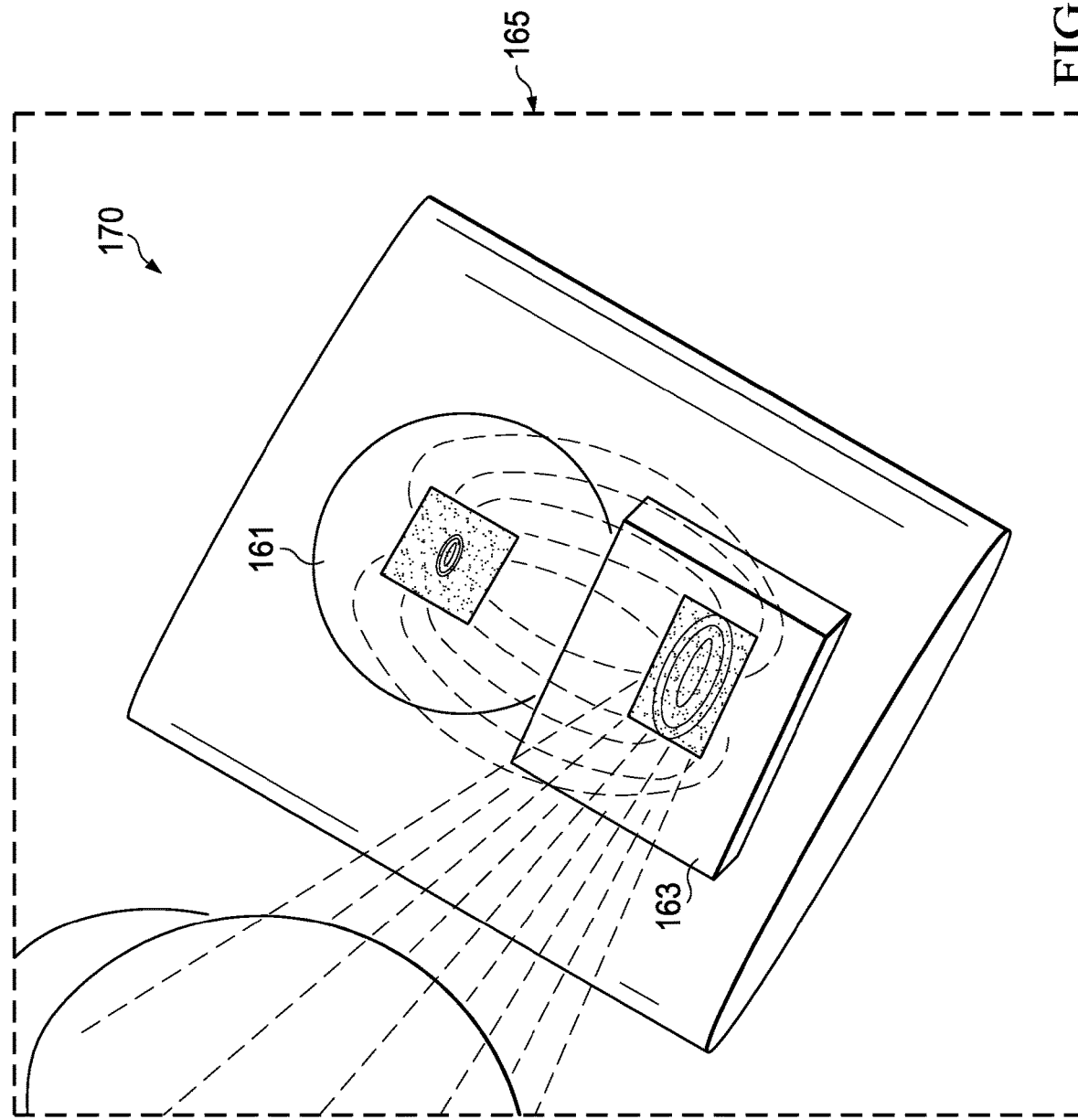

FIGS. 14A-C illustrate the operation of an example arrangement 170 described herein while projecting a first beam pattern onto a roadway, for example. In FIG. 14A, a beam with a peak closer to the center of the field of view of high light distribution is shown projected by a DMD headlight module 171. In FIG. 14B, in an expanded view of system 170, headlight lamp module 171 is shown with a DMD and illumination module 165 with a DMD 163 and a phosphor 161 shown reflecting light to a projection optics 169 and outputting the light through a lens 167. The final projection lens 167 can be optically powerful or just act as a transmission element or as a beam shaping element. Also, a cover 168 will be used as shown to protect the optics and the DMD from the elements. Example materials for cover 168 include transparent or semi-transparent plastic and glass as are commonly used for headlight covers. FIG. 14C shows system 170 and the DMD module 165 in another expanded view, and the pattern output by the phosphor 161 is visible on the surface of the DMD 163. This pattern is then projected out of the system. In FIG. 14A, the pattern appears on the road as illustrated, such as at a distance of 25 meters away.

Figures 15A, 15B:
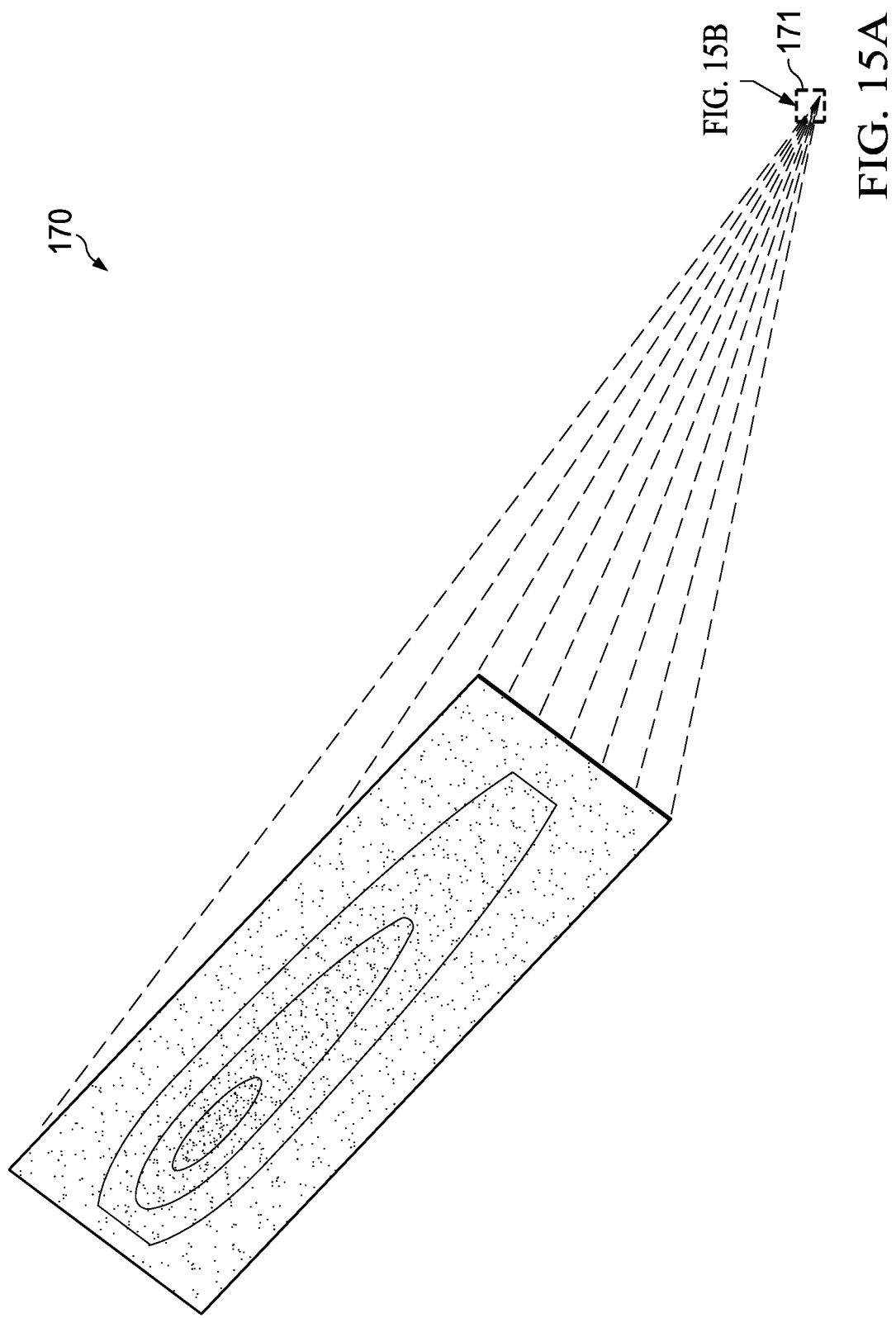
FIGS. 15A-C are a system diagram and corresponding expanded views of the operation of the headlight module of FIGS. 14A-C used in projecting another pattern of illumination.
Figure 15B:
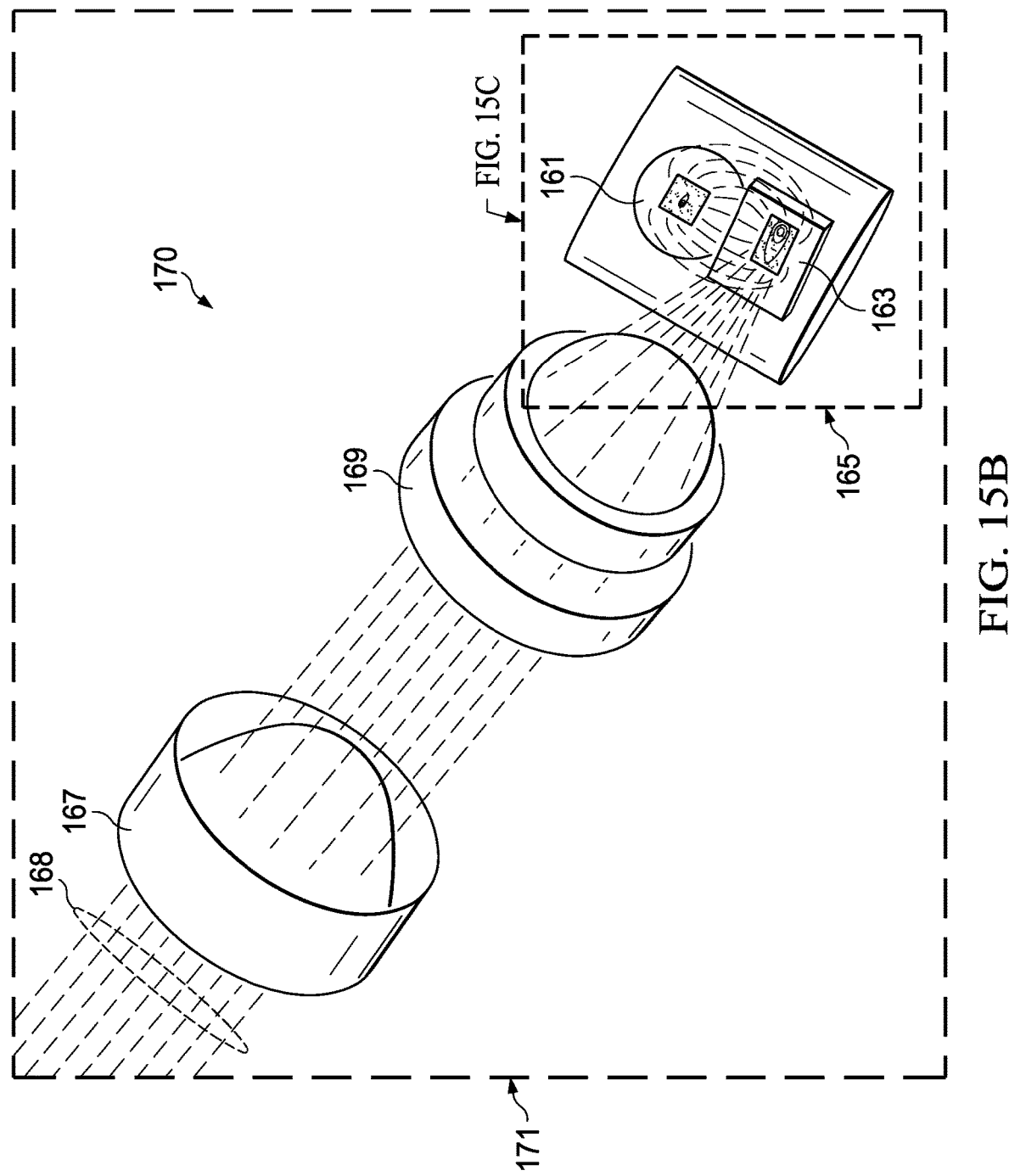
Figure 15C:
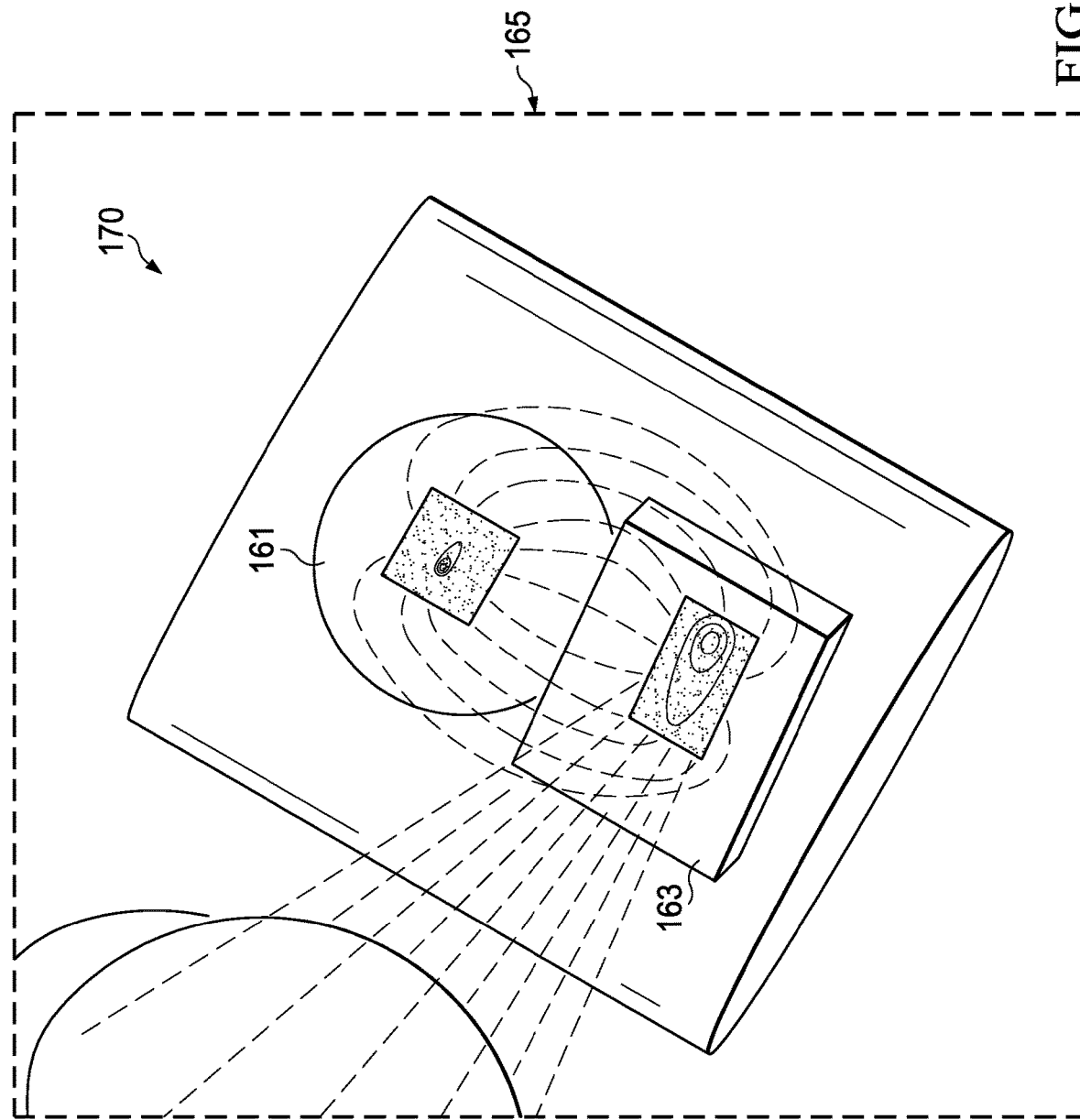

FIGS. 15A-C illustrate the operation of the example arrangement 170 of FIG. 14A in projecting a different shaped headlight beam. FIG. 15A shows the headlight module 171 (including the arrangements described herein) projecting a different pattern onto the roadway, such as at a distance of 25 meters. FIG. 15B illustrates the headlight module 171 and system 170 in an expanded view including the DMD module 165 with phosphor 161 again shown projecting a pattern onto the DMD 163 which is then reflected and output through projection optics 169 and 167 out of cover 168, and then projected by the headlight onto a road. FIG. 15C illustrates the system 170 and DMD module 165 in an expanded view including the phosphor 161 and the DMD 163 and depicts the pattern from the phosphor 161 projected onto the surface of the DMD 163. FIG. 15A shows the modified output pattern, such as at a 25 meters distance from the headlight module 171. In this operation, a beam is shown with peak intensity shifted to a side of field of view when compared to that of FIGS. 14A-C, and the phosphor pattern has correspondingly shifted to a side (such as a side away from the oncoming traffic in an automotive application), and the pattern is directed onto the DMD 163 and then reflected into the projection optics 169 before being projected onto the road. Using the laser illumination sources to adaptively change the pattern on the phosphor 161 in conjunction with using the DMD 163 to further shape the light beam enables a highly efficient and adaptive headlamp beam to be created, without the need of reflecting light into a light dump as in conventional solutions.

Advantages attained by use of the novel methods described herein of using multiple laser illumination sources with the DMD include that the illumination system can output adaptively shaped beams in an efficient manner. The beam shaping is performed using both the laser illumination sources to form a pattern and further adapted by tilting some of the micromirrors in the DMD away from the illumination sources, to further refine and shape the beam output by the system.

In various arrangements described herein, different technology DMD devices may be used. Devices such as the "VSP" (very small pixel) technology DMD devices from Texas Instruments Incorporated can be used. Currently VSP DMD devices are available, such as 0.3 inch diagonal arrays with WVGA resolution. An example commercially available part is the DLP3000, sold by Texas Instruments Incorporated, which has an array of 608×684 micrometer sized micromirrors, which is 415872 total mirrors. The DLP3000 device is useful in digital light projectors (DLP) for television and presentation video projectors, among other applications.

In another arrangement, TRP DMDs with micromirrors that move in a different manner can be used. These devices are available, such as part number DLP3114 available from Texas Instruments Incorporated. In the TRP technology, the micromirrors are formed on a compound hinge 80. The micromirrors tilt left horizontally in a first tilted position, and tilt downwards in a second tilted position. The TRP DMD micromirrors are oriented in an orthogonal array, and the hinge axis is diagonal and has compound motion, instead of vertical as in the VSP technology devices. In an example, a device DLP3114 from Texas Instruments Incorporated has 1280×720 micromirrors, or over 921600 pixel elements. This device provides 720p resolution. Other TRP devices offered by Texas Instruments Incorporated have over 1 million mirrors. A 0.47 inch array of TRP pixels offers 1080p resolution.

The examples of the VSP DMD and TRP DMD devices described above illustrate arrangements formed with DMD devices that are currently commercially available from Texas Instruments Incorporated. However, the arrangements described herein are not so limited. Various DMD devices can be used in the arrangements.

In an example application, an automotive headlamp is implemented using the novel arrangements described above, and the projected beam can be adaptively modified. For example, in the automotive headlamp application, when oncoming traffic is detected as the car travels along a roadway; the adaptive light beam can be dipped lower and directed away from the eyes of the drivers in the oncoming traffic, while the overall brightness is maintained. Once the oncoming traffic passes the light beam can be returned to a normal pattern. These functions can be performed autonomously, freeing the car driver from the responsibility of manually switching from high-beam to low-beam positions, for example.

In additional arrangements, the profiles of the illumination sources can be varied, that is, the intensity of the laser illumination sources can be modified to create a desired intensity pattern and additional beam shaping and further adaptive beam shaping can be accomplished by using different DMD profiles to tilt selected mirrors "off" while others are "on" at the same time the intensity pattern is presented to the DMD device. The DMD device can therefore be used to fine tune or further refine the pattern created using intensity control of the laser illumination sources.

In an example application, an automotive headlamp includes a DMD device that is illuminated by white light created using a laser excited phosphor and that projects a beam of light through a lens or other optics. The arrangements described herein advantageously provide a light or lamp using a laser-phosphor illuminated DMD device as a projection source, with adaptive beam shaping, greater brightness, and greater efficiency.

These improvements in adaptive beam illumination using light projection incorporating DMD devices address the deficiencies and the disadvantages of conventional approaches. These solutions are energy efficient and robust, and they provide reliable device operation with high brightness and long device life, and they are easy to implement and use.

Modifications are possible in the described embodiments, and other embodiments are possible, within the scope of the claims.

What is claimed is:

1. An illumination system, comprising:
at least first and second laser illumination sources having respective first and second control inputs;
a light modulator having a third control input;
a down converter material, optically coupled between the light modulator and the laser illumination sources, the down converter material configured to emit light when illuminated by one or more of the laser illumination sources, in which: the first laser illumination source is optically coupled to only a first portion of the down converter material; the second laser illumination source is optically coupled to only a second portion of the down converter material; and the first and second portions are only partially overlapping; and control circuitry having first, second and third control outputs, the first control output coupled to the first control input, the second control output coupled to the second control input, and the third control output coupled to the third control input, in which the first, second and third control outputs are configured to: cause the first laser illumination source to adaptively vary a first intensity of illuminating the first portion of the down converter material while the second laser illumination source illuminates the second portion of the down converter material; cause the second laser illumination source to adaptively vary a second intensity of illuminating the second portion of the down converter material while the first laser illumination source illuminates the first portion of the down converter material; and cause the light modulator to allow a selected amount of the down converter material's emitted light to be projected from the system, the first intensity being different from the second intensity at various times.

2. The illumination system of claim 1, wherein the first and second laser illumination sources emit visibly blue light.

3. The illumination system of claim 1, wherein the down converter material comprises a phosphor.

4. The illumination system of claim 1, wherein the down converter material is a phosphor module configured to emit yellow and white light when illuminated by blue or ultraviolet (UV) light from one or more of the laser illumination sources, and a light resulting therefrom is visibly white.

5. The illumination system of claim 4, wherein the phosphor module is a reflective type or a transmissive type.

6. The illumination system of claim 1, further comprising a third laser illumination source.

7. The illumination system of claim 6, wherein the laser illumination sources are arranged in a horizontal row to form respective left, center and right illumination sources.

8. The illumination system of claim 6, wherein the laser illumination sources are arranged in a vertical column to form respective upper, center and lower illumination sources.

9. The illumination system of claim 1, further comprising illumination optics, optically coupled between the down converter material and the light modulator, the illumination optics configured to direct the down converter material's emitted light onto the light modulator.

10. The illumination system of claim 1, further comprising projection optics optically coupled to the light modulator, the projection optics configured to project the selected amount of the down converter material's emitted light from the system.

11. The illumination system of claim 10, wherein the projection optics comprise a cover of an automotive headlamp.

12. The illumination system of claim 1, wherein the first control output is configured to cause the first laser illumination source to adaptively vary the first intensity by varying a current to the first laser illumination source.

13. The illumination system of claim 1, wherein the first control output is configured to cause the first laser illumination source to adaptively vary the first intensity by pulse width modulating a power signal to the first laser illumination source.

14. The illumination system of claim 1, wherein the light modulator is a digital micromirror device.

15. The illumination system of claim 14, wherein the digital micromirror device is a tilt and roll pixel digital micromirror device or a very small pixel digital micromirror device.

16. A method of projecting light for illumination, the method comprising:

directing light from a first laser illumination source onto only a first portion of a down converter material;

directing light from a second laser illumination source onto only a second portion of the down converter material, wherein the first and second portions are only partially overlapping;

when the down converter material is illuminated by one or more of the laser illumination sources, directing light emitted from the down converter material onto a light modulator;

causing the first laser illumination source to adaptively vary a first intensity of illuminating the first portion of the down converter material while the second laser illumination source illuminates the second portion of the down converter material;

causing the second laser illumination source to adaptively vary a second intensity of illuminating the second portion of the down converter material while the first laser illumination source illuminates the first portion of the down converter material, the first intensity being different from the second intensity at various times; and causing the light modulator to allow a selected amount of the down converter material's emitted light to be projected from a light projection system.

17. The method of claim 16, wherein causing the first laser illumination source to adaptively vary the intensity comprises varying current to the first laser illumination source.

18. The method of claim 16, wherein causing the first laser illumination source to adaptively vary the intensity comprises pulse width modulating of a power signal to the first laser illumination source.

19. The method of claim 16, wherein directing light from the first laser illumination source comprises directing light in the blue visible light spectrum, and the down converter material emits yellow light in response thereto.

20. The method of claim 16, wherein directing light emitted from the down converter material comprises directing visibly white light.

21. The method of claim 16, wherein the light modulator is a digital micromirror device.

22. The method of claim 21, wherein the digital micromirror device is a tilt and roll pixel digital micromirror device or a very small pixel digital micromirror device.

23. The method of claim 16, wherein the down converter material comprises a phosphor module that is a reflective type or a transmissive type.

24. A headlamp, comprising:

at least first and second laser illumination sources having respective first and second control inputs;

a light modulator having a third control input;

a phosphor, optically coupled between the light modulator and the laser illumination sources, the phosphor configured to emit light when illuminated by one or more of the laser illumination sources, in which: the first laser illumination source is optically coupled to only a first portion of the phosphor; the second laser illumination source is optically coupled to only a second portion of the phosphor; and the first and second portions are only partially overlapping;

illumination optics, optically coupled between the phosphor and the light modulator, the illumination optics configured to direct the phosphor's emitted light onto the light modulator;

projection optics optically coupled to the light modulator, the projection optics configured to collect light from the light modulator and having a lens configured to project the collected light out of the headlamp; and a controller having first, second and third control outputs, the first control output coupled to the first control input, the second control output coupled to the second control input, and the third control output coupled to the third control input, in which the first, second and third control outputs are configured to: cause the first laser illumination source to adaptively vary a first intensity of illuminating the first portion of the phosphor while the second laser illumination source illuminates the second portion of the phosphor; cause the second laser illumination source to adaptively vary a second intensity of illuminating the second portion of the phosphor while the first laser illumination source illuminates the first portion of the phosphor; and cause the light modulator to allow a selected amount of the phosphor's emitted light to be projected from the projection optics, the first intensity being different from the second intensity at various times.

25. The headlamp of claim 24, wherein the first and second laser illumination sources emit visibly blue light.

26. The headlamp of claim 24, wherein the phosphor is configured to emit yellow and white light when illuminated by blue or ultraviolet (UV) light from one or more of the laser illumination sources, and a light resulting therefrom is visibly white.

27. The headlamp of claim 24, wherein the phosphor is a reflective type or a transmissive type.

28. The headlamp of claim 24, further comprising a third laser illumination source.

29. The headlamp of claim 28, wherein the laser illumination sources are arranged in a horizontal row to form respective left, center and right illumination sources.

30. The headlamp of claim 28, wherein the laser illumination sources are arranged in a vertical column to form respective upper, center and lower illumination sources.

31. The headlamp of claim 24, wherein the headlamp is an automotive headlamp, and the projection optics comprise a cover of the automotive headlamp.

32. The headlamp of claim 24, wherein the first control output is configured to cause the first laser illumination source to adaptively vary the first intensity by varying a current to the first laser illumination source.

33. The headlamp of claim 24, wherein the first control output is configured to cause the first laser illumination source to adaptively vary the first intensity by pulse width modulating a power signal to the first laser illumination source.

34. The headlamp of claim 24, wherein the light modulator is a digital micromirror device.

35. The headlamp of claim 34, wherein the digital micromirror device is a tilt and roll pixel digital micromirror device or a very small pixel digital micromirror device.

* * * * *